United States Patent

Haruki

[11] Patent Number: 5,990,949
[45] Date of Patent: Nov. 23, 1999

[54] DIGITAL STILL CAMERA WHICH DISPLAYS A GAMMA-CORRECTED HIGH-QUALITY STILL IMAGE UPON DEPRESSION OF A SHUTTER RELEASE BUTTON BUT WITHOUT DISPLAYING AN UNWANTED IMAGE

[75] Inventor: Toshinobu Haruki, Kyotanabe, Japan

[73] Assignee: Sanyo Electric Co., Ltd., Osaka, Japan

[21] Appl. No.: 08/863,975

[22] Filed: May 27, 1997

[30] Foreign Application Priority Data

May 31, 1996 [JP] Japan ................................. 8-139222

[51] Int. Cl.⁶ ............................................. H04N 5/202
[52] U.S. Cl. ........................ 348/254; 348/231; 348/220
[58] Field of Search ................................. 348/207, 220, 348/221, 222, 254, 674, 675, 333, 334, 230, 232, 233; 358/518, 519

[56] References Cited

U.S. PATENT DOCUMENTS

5,077,612 12/1991 Meggardt et al. ..................... 348/220
5,444,483 8/1995 Maeda .................................... 348/220
5,764,287 6/1998 Tatsumi ................................. 348/254

Primary Examiner—Tuan Ho
Attorney, Agent, or Firm—Michaelson & Wallace; Peter L. Michaelson

[57] ABSTRACT

A digital still camera includes a shutter release button. A first gamma correction circuit, when a shutter release button is depressed, references a first gamma table to correct a camera signal by a gamma characteristic of a raster scan display, creating a first image signal. The first image signal is subjected to interpolation/thinning-out and image processing by a first signal processing circuit. A thinned-out image signal is corrected in a second gamma correction circuit by a gamma characteristic for converting a raster-scan display gamma characteristic into a dot-matrix display gamma characteristic, thereby creating a second image signal. The second image signal is displayed on an LCD (Liquid Crystal Display). The first image signal is also subjected by a second signal processing circuit to interpolation, YUV conversion and JPEC compression so that a compressed image signal is stored in a memory flash. The compressed image signal is read out of the flash memory as required, to be outputted to a CRT.

2 Claims, 10 Drawing Sheets

| R | G | R | G | R | | G | R | G |
|---|---|---|---|---|---|---|---|---|
| G | B | G | B | G | . . . | B | G | B |
| R | G | R | G | R | | G | R | G |
| | | | | | . . . | | | |
| R | G | R | G | R | . . . | G | R | G |
| G | B | G | B | G | | B | G | B |

DIGITAL STILL CAMERA WHICH DISPLAYS A GAMMA-CORRECTED HIGH-QUALITY STILL IMAGE UPON DEPRESSION OF A SHUTTER RELEASE BUTTON BUT WITHOUT DISPLAYING AN UNWANTED IMAGE

BACKGROUND OF THE INVENTION

1. Field of the Invention

This invention relates to digital still cameras, more particularly to a digital still camera adapted to display a photographed image on an LCD and store the same image in a flash memory.

2. Prior Art

Figure 11:
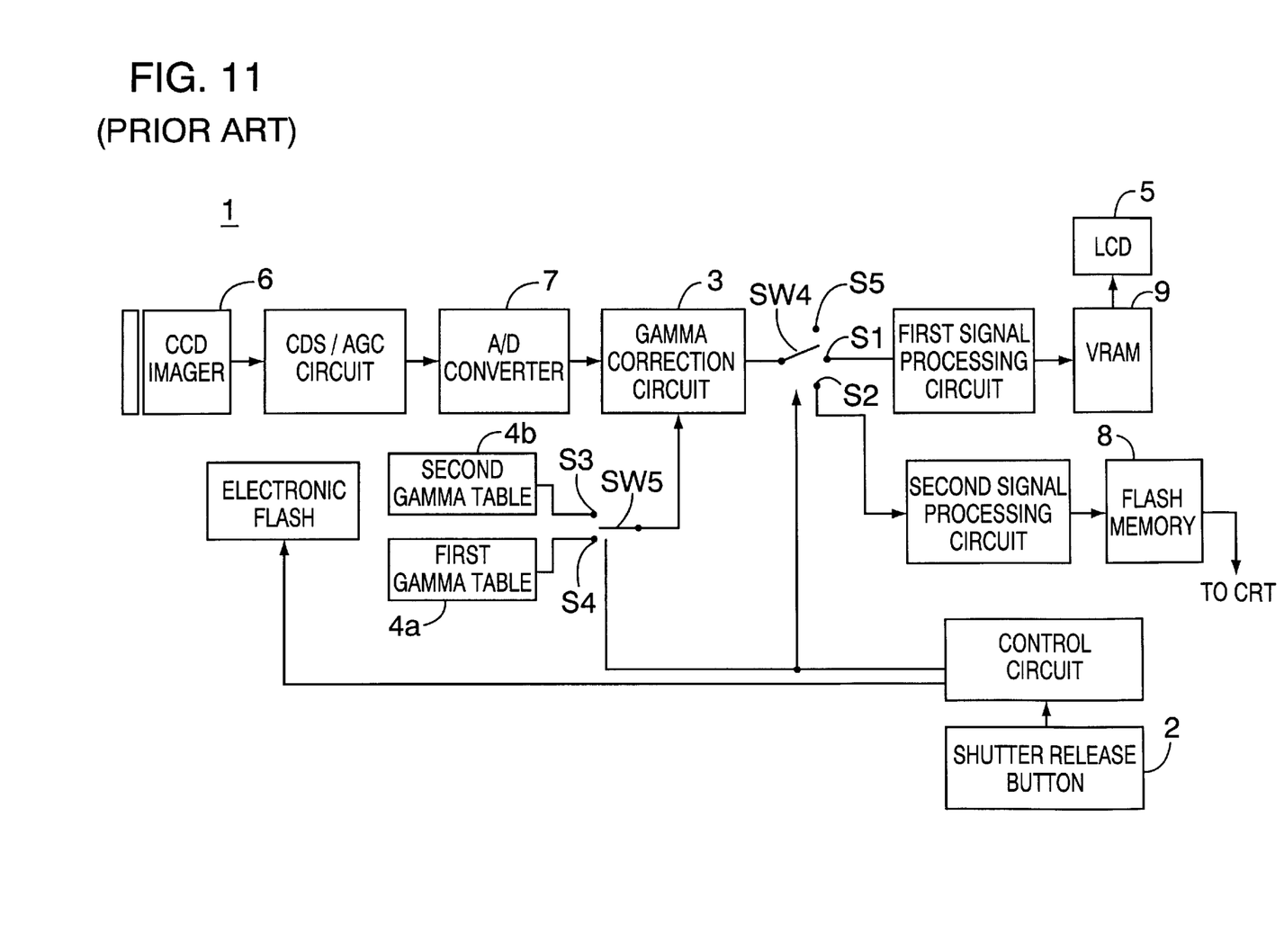
FIG. 11 is a block diagram showing a conventional art.

In a digital still camera 1 of this kind as shown in FIG. 11, the switches SW4 and SW5 are respectively connected to the terminals S1 and S3 while a shutter release button 2 is not depressed. Accordingly, a gamma-correction circuit 3 makes reference to a second gamma table to gamma-correct a motion image signal appropriate for a bit map display, thereby outputting a high-quality motion picture on an L CD 5. On the other hand, if the shutter release button 2 is depressed, the switch SW4 is connected to the terminal S2 while the switch SW5 is connected to a terminal S4. When a still image upon depression of the shutter release button 2 is obtained from the gamma-correction circuit, the switch SW4 is connected to the terminal S5, thereby disabling the CCD imager 6. The gamma-correction circuit 3 makes reference to a first gamma table 4a to gamma-correct a still image signal from an A/D converter 7 appropriately for raster scan display so that a still image signal after correction is stored in the flash memory 8. On the other hand, a VRAM 9 is written with an image signal that occurs immediately before changing over of the switch SW4 so that the image signal is displayed on the LCD 5 for a predetermined time period until the storage to the flash memory such has been completed.

However, in such a conventional art, there is a time difference between the image picture displayed on the LCD 5 and the picture image stored in the flash memory 8. As a result, there arises deviation between the images if an object is moving at a high speed.

SUMMARY OF THE INVENTION

It is therefore a primary object of the invention to provide a novel digital still camera.

Another object of the invention relates to a digital still camera which is capable of displaying a still image picture with high quality at time when a shutter release button is depressed.

In accordance with the invention, a digital still camera comprising: a shutter release button; a first correction means for correcting a camera signal, at time that said shutter release button is depressed, by a first gamma characteristic to output a first image signal; a storing means for storing the first image signal in a memory; a second correction means for correcting the first image signal by a second gamma characteristic to output a second image signal; and a display means for displaying the second image signal until storage of the first image signal to said memory is completed.

In the present invention, when the shutter release button is depressed, the camera signal at that time is corrected by the gamma characteristic of the raster scan display. A first image signal obtained is subjected for example to interpolation, YUV conversion and JPEG compression so that a resulting compressed signal is stored for example in a flash memory. The first image signal is also subjected for example to image processing such as interpolation/thinning-out and color separation, and a resulting thinned-out image signal is corrected by a gamma characteristic for changing a raster-scan display gamma characteristic into a dot-matrix display gamma characteristic. A second image signal obtained by the correction is displayed on a dot-matrix display.

In accordance with one aspect of the invention, the first correcting means includes a first table having a gamma characteristic of a raster scan display, a third table having a gamma characteristic of a dot matrix display, and a switch for selecting either one of the first table or the third table. While the shutter release button is not depressed, the switch is connected to a third-table side and the second correcting means is disabled. This provides display on the dot matrix display of an image that is appropriately gamma-corrected for dot matrix displaying. If the shutter release button is depressed, the switch is connected to a first-table side and the second correcting means is enabled. Accordingly, the camera signal is first corrected by a first gamma correcting means so as to be suited for the raster scan display, and thereafter the thinned-out image signal is corrected so as to be suited for the bit matrix display. To this end, display is made on the dot matrix display for a desired still image picture at the time of depressing the shutter release button.

In accordance with another aspect of the invention, a muting means subjects muting to the display means during a second predetermined period from depression of said shutter release button to completion of correction by the second correcting means. Therefore, there is no possibility of displaying an unwanted image picture on the dot matrix display.

In another aspect of the invention, an electronic flash for example illuminates in response to operation of the shutter release button so that a still image at that time is displayed on the dot matrix display and stored in a flash memory.

According to the invention, the camera signal at a time that the shutter release button is depressed is corrected by the first gamma characteristic and the first image signal is corrected by the second gamma characteristic, so that it is possible to display a high-quality still image picture that is taken at the time of depression of the shutter release button.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
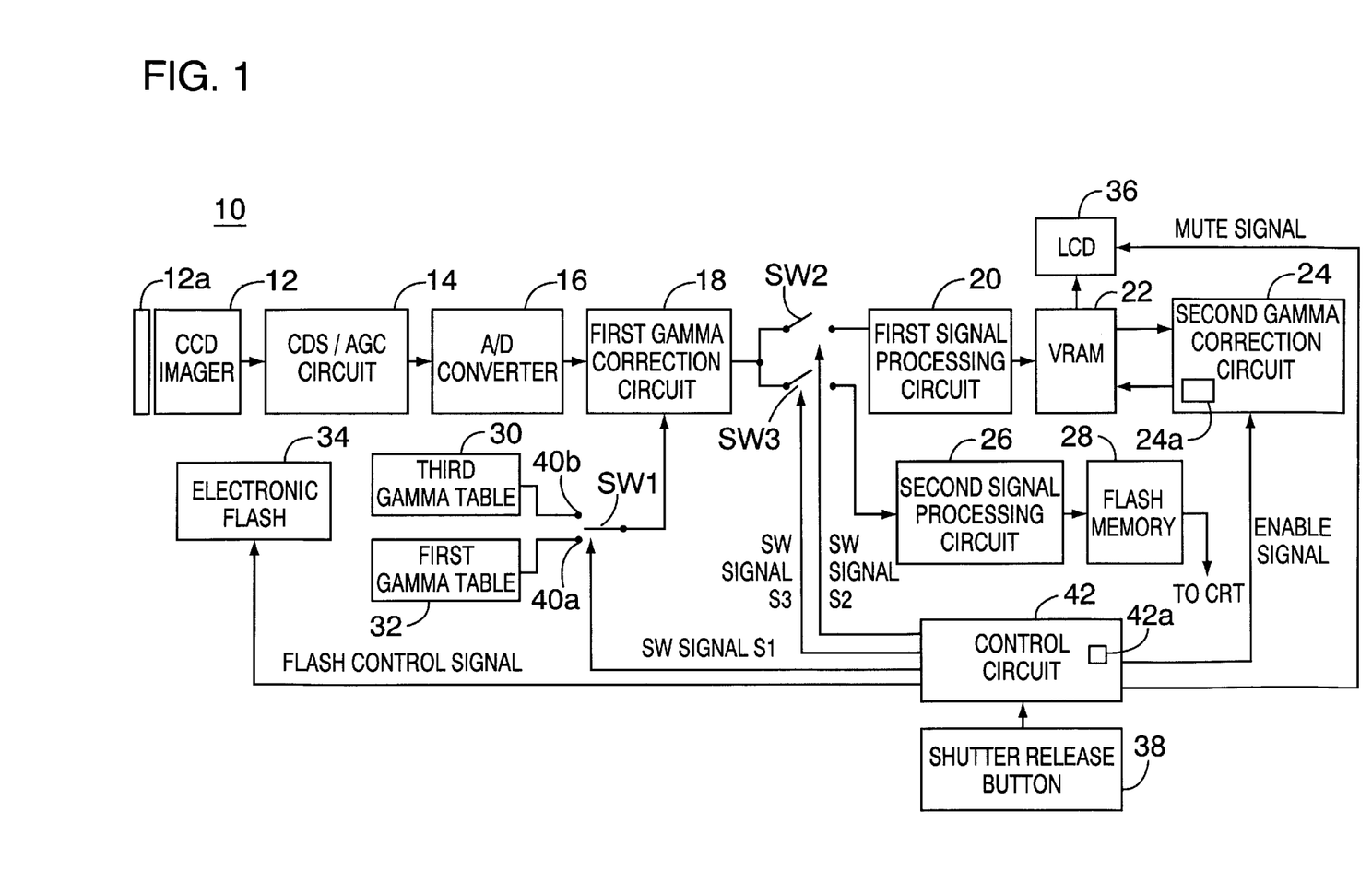
FIG. 1 is a block diagram showing one embodiment of this invention.
Figure 2:
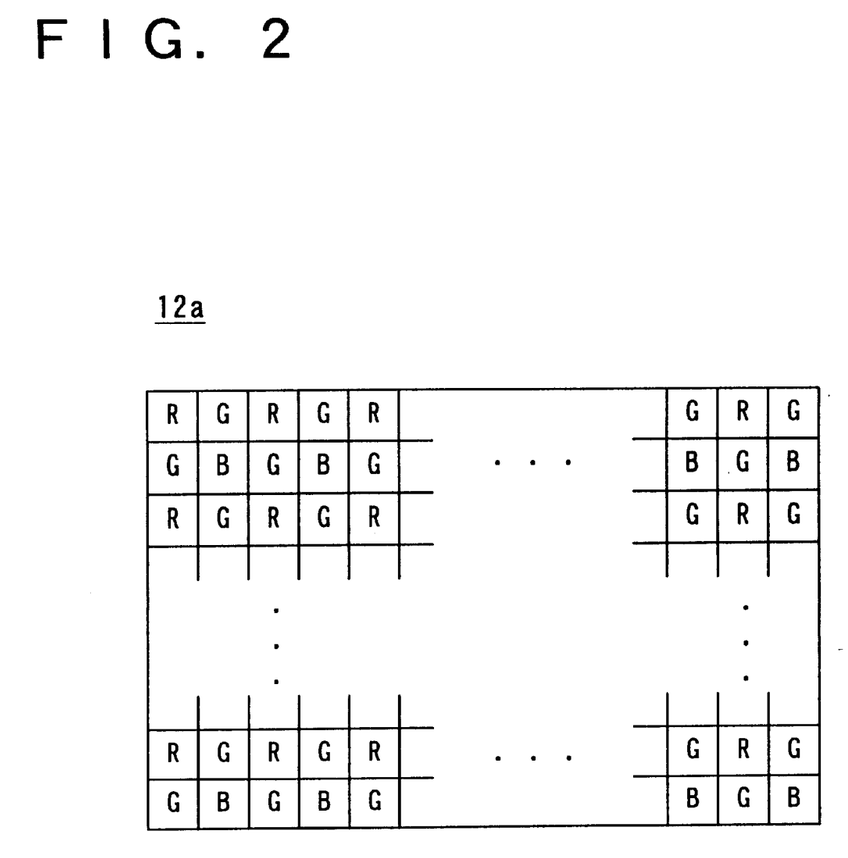
FIG. 2 is an illustrative view showing a mosaic type primary-color filter.

Referring to FIG. 1, a digital still camera 10 of this embodiment includes a CCD imager 12. The CCD imager 12 receives optical images of an object through a mosaic type primary-color filter 12a as shown in FIG. 2 to create a camera signal corresponding to the optical image. The camera signal is subjected to correlate double sampling and automatic gain control by a CDS/AGC circuit 14. The camera signal thus processed is converted into a digital signal by an A/D converter 16.

Figure 4:
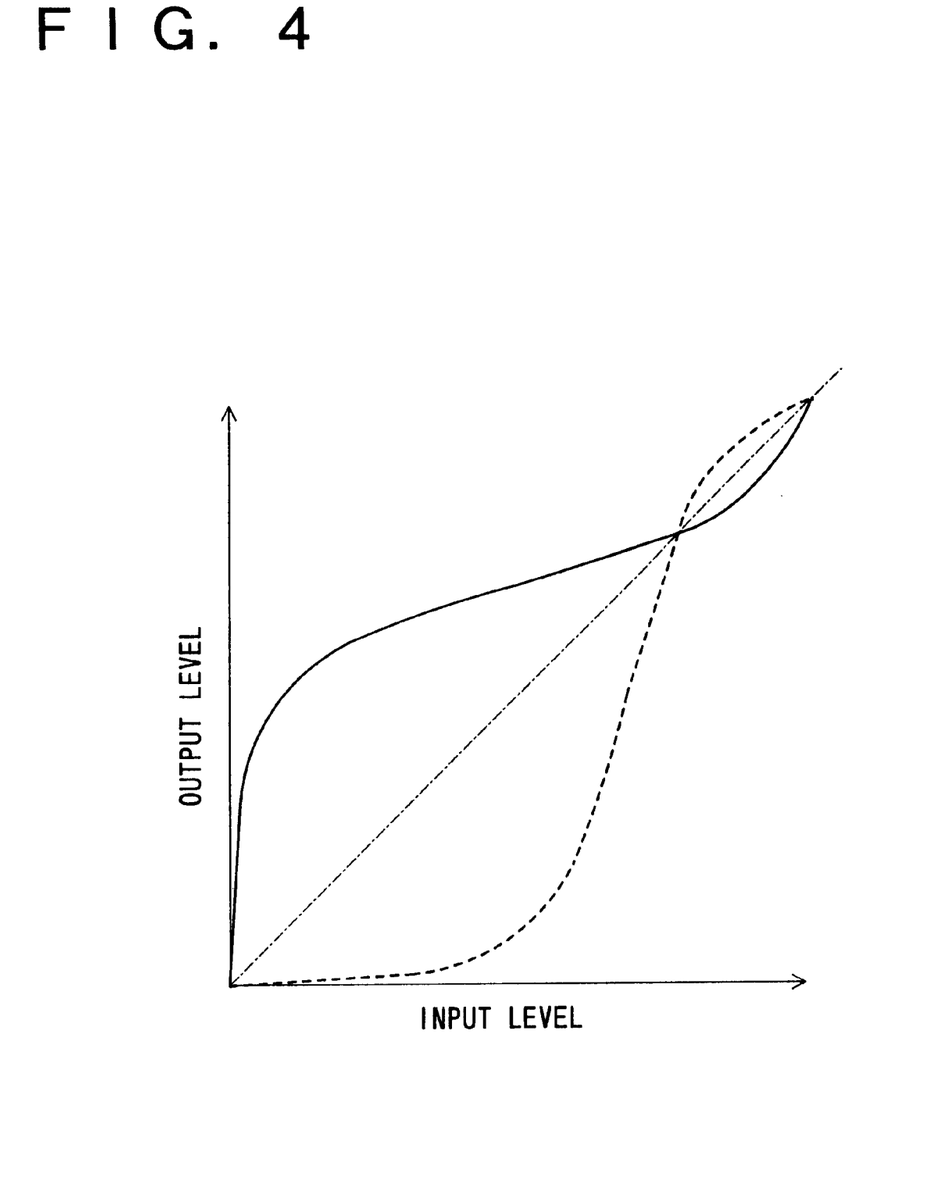
FIG. 4 is a graph showing a gamma characteristic of dot matrix display.

While a shutter release button 38 is not depressed, a control circuit 42 connects the switch SW1 to a terminal 40b, turned on a switch SW2, and turned off a switch SW3. A third gamma table 30 is previously stored with a gamma characteristic for bit map display, as shown in FIG. 4. A first gamma correction circuit 18 references third gamma table to gamma-correct the digital signal from the A/D converter 16 in a manner appropriate for bit map display. The gamma-corrected digital signal, or a first image signal, is delivered to a first signal processing circuit 20 where it is subjected to processing appropriate for LCD display by an interpolation/thinning-out circuit 20a and an image processing circuit 20b shown in FIG. 6.

That is, the number of pixels of an LCD 36 is ¼ of the number of pixels of the CCD imager 12, and the digital signal contains image pixel signals each having either one component of R, G or B so that the pixel signal is interpolated with the every other adjacent pixel every two pixels in the respective horizontal and vertical directions. The pixel signal thus interpolated only is delivered to a VRAM 22. Explaining in detail by using FIG. 7, four pixels to be considered contain components of $G_1$, $G_2$, R and B. Where generating R, G and B components at a position of a pixel with a $G_1$ component, the adjacent R and B components are used as they are while the G component is determined according to Equation 1.

Figure 7:
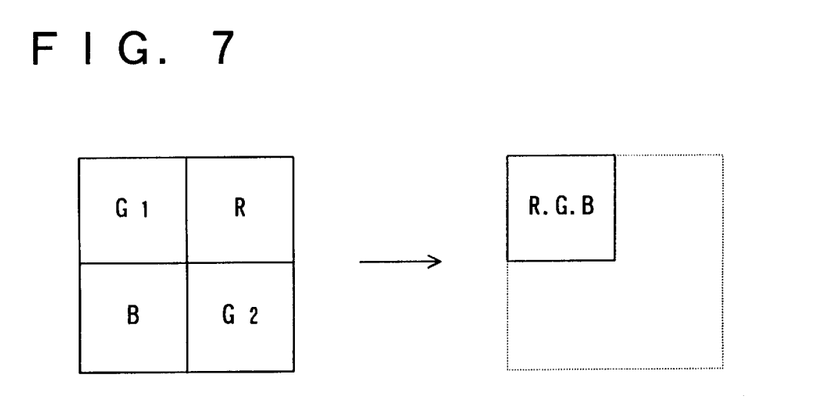
FIG. 7 is an illustrative view showing interpolation and thinning-out processes.

[Equation 1]

$$G=(G_1+G_2)/2$$

Incidentally, the number of pixels of the LCD 36 is ¼ of the number of pixels of the CCD imager 12 as stated above, so that there is no necessity of interpolation processing for a pixel of R, B or $G_2$ component. Incidentally, the component $G_1$ may be outputted as it is without determining the component G according to Equation 1.

Figure 6:
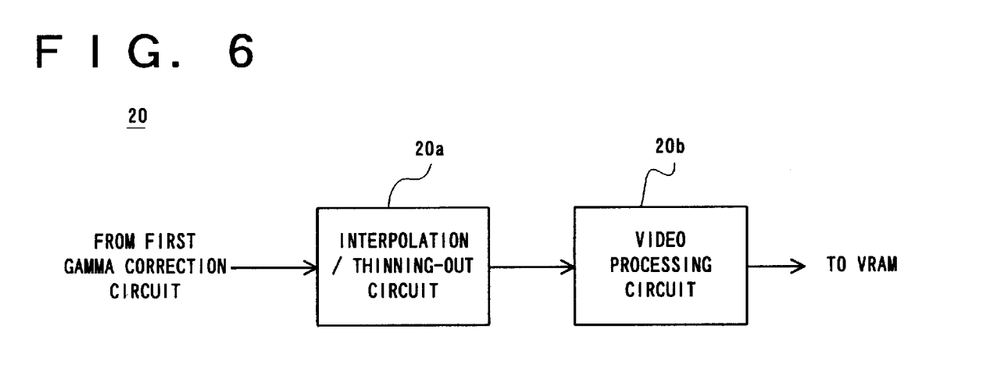
FIG. 6 is a block diagram showing a first signal processing circuit.

The output of the interpolation/thinning-out circuit 20a is subsequently subjected to image processing such as color separation by the image processing circuit 20b. The second image signal thus obtained is successively written into the VRAM 22. While the shutter release button 38 is not depressed, the second gamma-correction circuit 24 is disabled so that the second image signal stored in the VRAM 22 is delivered to the LCD 32 as it is, thereby displaying a desired image-quality motion picture.

Figure 3:
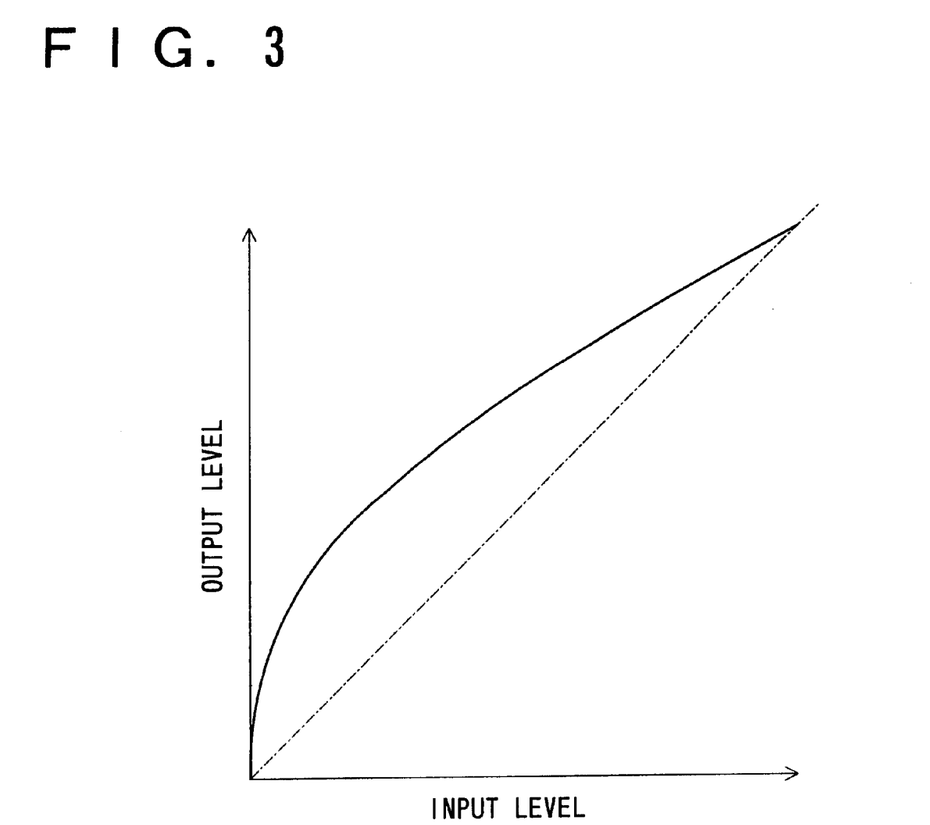
FIG. 3 is a graph showing a gamma characteristic of raster scan display.

On the other hand, when the shutter release button 38 is depressed, the control circuit 42 turns on the switch SW3 in addition to the switch SW2, to connect the switch SW1 to a terminal 40a, activating a second gamma correction circuit 24a. The control circuit 42 further causes illumination of an electronic flash 34. The first gamma table 32 is previously stored with a gamma characteristic for raster scan display as shown in FIG. 3. The first gamma correction circuit 18 makes reference to the first gamma table to make correction to the camera signal from the A/D converter 16 appropriately for raster scan display. When the shutter release button 38 is depressed, the switch SW1 also returns on, so that the first image signal outputted from the first gamma correction circuit 18 is delivered also to the second signal processing circuit 26. The control circuit 42 turns off the switches SW2 and SW3 at a time when the first gamma correction circuit 18 creates a first image signal by one frame after the shutter release button 38 was depressed. This disables the CCD imager 12, the CDS/AGC circuit 14 and the A/D converter 16 so that the first signal processing circuit 20 and the second signal processing circuit 26 are inputted only with a still image signal upon depression of the shutter release button 38.

Figure 8:
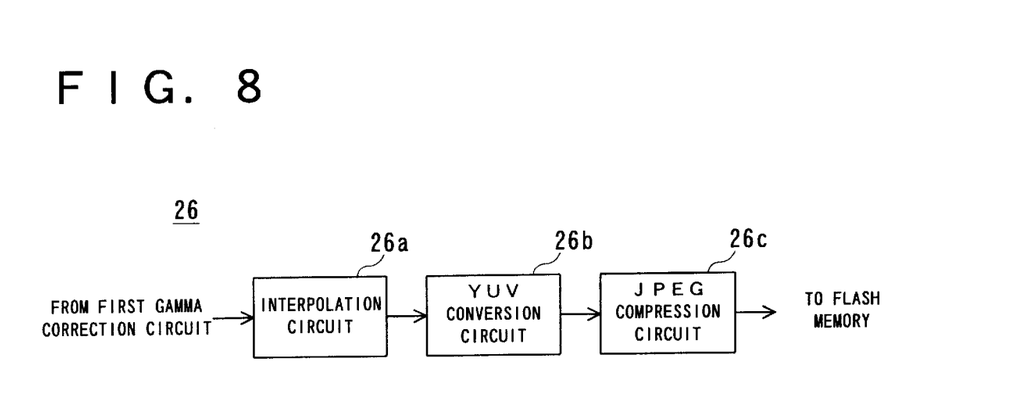
FIG. 8 is a block diagram showing a second signal processing circuit.

Referring to FIG. 8, in the second signal processing circuit 26, the interpolation circuit 26a creates R, G and B components for one pixel from 16 pixel signals. The signals R, G and B thus created are converted into Y, U and V signals, and thereafter the Y, U and V signals are compressed by a JPEG compression circuit 26c according to a JPEG format. The compressed signals are stored in the flash memory 28. Incidentally, the detailed operation of the interpolation circuit 26a is described in Japanese Provisional Patent Publication No. H8-237672 [H04N9/07] that has been laid open on Sep. 13, 1996. The image stored in the flash memory 28 is outputted as required to a personal computer or a television receiver not shown so that the image picture is displayed on a CRT.

Figure 5:
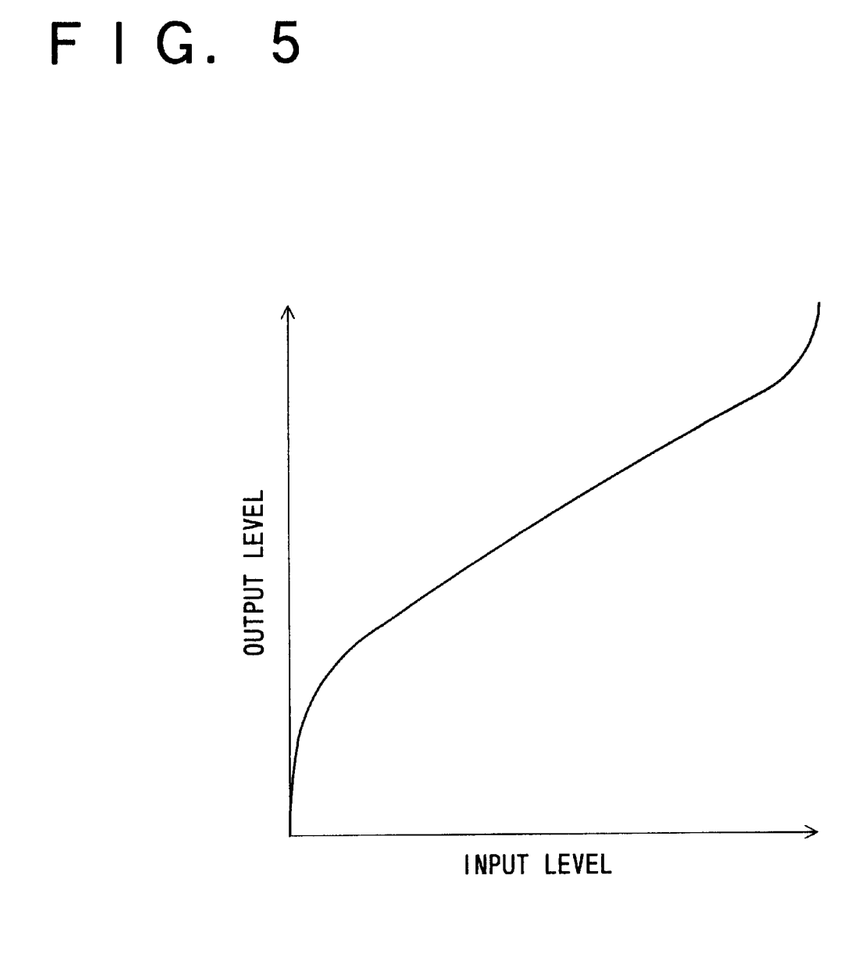
FIG. 5 is a graph showing a gamma characteristic for conversion of a raster-scan display gamma characteristic into a dot-matrix display gamma characteristic.

On the other hand, the first image signal via the switch SW2 is subjected to interpolation/thinning-out and image processing by the first signal processing circuit 20 in a manner similar to the above so that a thinned-out signal having a characteristic appropriate for raster scan display is stored in the VRAM 22. When the shutter release button 38 is depressed, the second gamma correction circuit 24 activates so that the thinned-out signal is subjected to gamma correction. That is, the second gamma correction circuit 24a is previously stored with the second gamma table 24 having a gamma characteristic, as shown in FIG. 5 for, converting a raster-scan display gamma characteristic into a dot-matrix display gamma characteristic. The second gamma-correction circuit 24 read pixel-by-pixel of a thinned-out image signal out of the VRAM 22, to make gamma correction to each pixel signal according to the second gamma table. This provides a thinned-out image signal suited for bit map display, and the thinned-out image signal is delivered to the LCD 36. To this end, on the LCD 36 is displayed a high-quality still picture at a time when the shutter release button 38 has been depressed. Incidentally, the gamma characteristic of the second gamma table 24a is of a characteristic that is synthesized of a reverse gamma characteristic to the gamma characteristic of the gamma first table 32 and with a gamma characteristic of the third gamma table 30. It takes time from the depression of the shutter release button 38 to the completion of gamma correction by the second gamma correction circuit 24, so that in that duration the control circuit 42 carries out muting to the LCD 36. The LCD 36 while being muted cuts-off an input from the VRAM 22 to output a predetermined black level signal. This provides display of a black image on the LCD 36 while the gamma correction is being made, preventing outputting of unwanted still image pictures. After the muting has been canceled, although the LCD 36 displays a still picture, the display of the still picture ends at the completion of writing the compression signal into the flash memory 28. The control circuit 42 brings the operation back to the state that the shutter release button 38 is before depressed thereby displaying a motion picture on the LCD 36.

Incidentally, the time period required for interpolation/thinning-out and image processing by the first signal processing circuit 20 and the gamma correction by the second gamma correction circuit 24 is shorter than that of the interpolation, YUV conversion and compression processing by the second signal processing circuit 26. Consequently, there is no case that the LCD 36 displays a motion picture without through the display of a still picture after the cancellation of muting.

By the operation of the digital still camera 10 in this manner, it is possible to display on the LCD 36 a high-quality still picture at the time that the shutter release button 38 is depressed. That is, where an object moving at a high speed is photographed, there is no possibility of occurring deviation between a still picture recorded by the flash memory 28 and a still picture displayed on the LCD 36. Also, since the first image signal is corrected by the first gamma table and thereafter the thinned-out image signal is corrected again by the use of the second gamma table 24a, both the still picture displayed on the LCD 36 and the still picture recorded by the flash memory 28 have a proper image quality.

Figure 9:
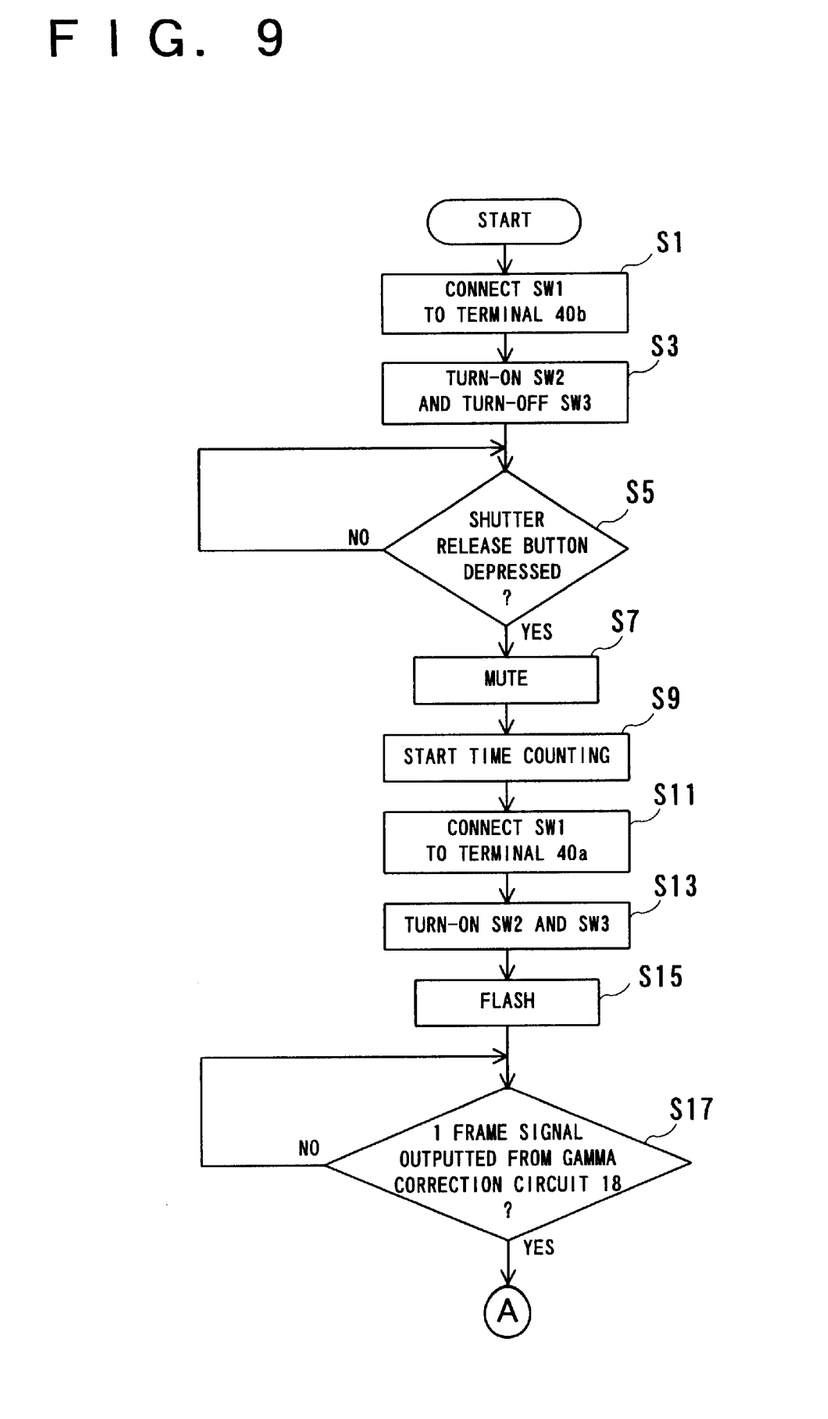
FIG. 9 is a flowchart showing operational positions in FIG. 1 embodiment.
Figure 10:
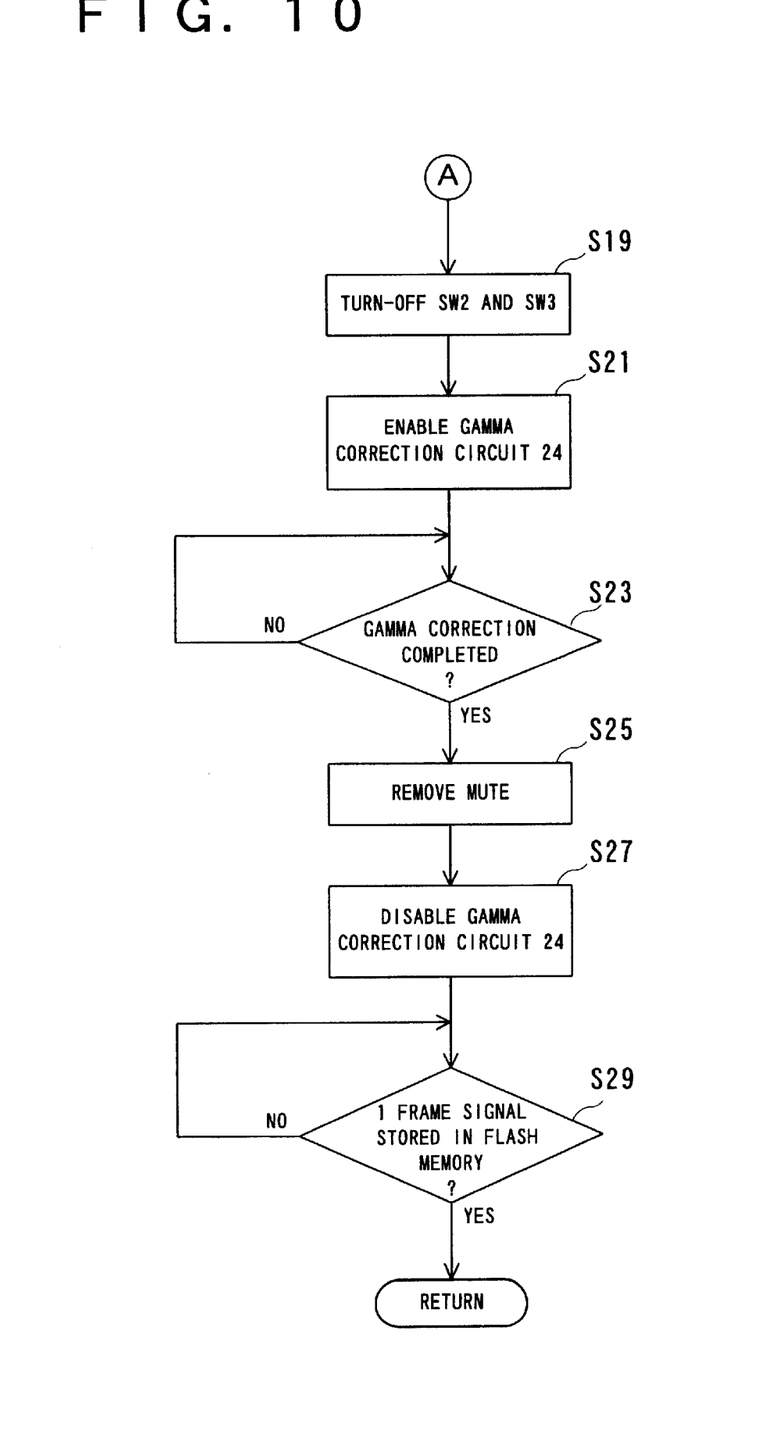
FIG. 10 is a flowchart showing another positions of FIG. 1 embodiment.

The control circuit 42, upon turning on a power supply, starts processing as shown by the flowchart in FIGS. 9 and 10. That is, at a step S1 the switch SW1 is connected to the terminal 40b, and then, at a step S3 the switch SW2 is turned on and the switch SW3 is turned off. Subsequently, it is determined at a step S5 whether or not the shutter release button 38 is depressed. Here, if "NO", the LCD 36 continues to display the moving picture. That is, the first gamma correction circuit 18 makes reference to the third gamma table 30 to gamma-correct the first image signal, and the VRAM 22 holds a thinned-out image signal with an image quality suited for bit map display, so that the LCD 36 displays a high quality moving picture.

On the other hand, if the shutter release button 38 is depressed, the control circuit 42 determines "YES" at a step S5, and outputs a muting signal at a step S7 to subject muting to the LCD 36. Then, at a step S9 a predetermined time period starting from the depression of the shutter release button 38 up to the completion of the gamma-correction by the second gamma correction circuit 24, is measured by a timer 42. The control circuit 42 subsequently connects the switch SW1 to the terminal 40a at a step S11, turns on both the switches SW2 and SW3, at a step S13, and causes the electronic flash 34 to illuminate at a step S15. This makes gamma-correction to the camera signal outputted from the A/D converter 16 according to the first gamma table.

After the gamma-correction circuit 18 completes to output the first image signal of one frame, i.e. the still picture signal at the time that the shutter release button 38 is depressed, the control circuit 42 determines "YES" at a step S17, to turn off the switch SW2 and SW3 at a step S19. Consequently, there are thereafter no cases that the first signal processing circuit 20 and the second signal processing circuit 26 are inputted with the first image signal, so that the thinned-out image signal of the still picture is stored by the VRAM that is at the time that the shutter release button 38 is depressed.

The control circuit 42 activates the second gamma-correction circuit 24 at a step S21. This makes gamma-correction to the thinned-out image signal stored by the VRAM 22. The control circuit 42 makes reference to the timer 42a at a step S23 to determine whether or not the predetermined time period has been elapsed. If "YES", it is determined that the second gamma-correction circuit 24 has completed correction, canceling the muting at a step S25. At a step S27 the second gamma-correction circuit 24 is disabled, and at a step S29 it is determined whether the storage of the compressed signal onto the flash memory 28 is completed or not. If "YES", the process returns to the step S1, repeating the similar process to the above. That is, the control circuit 42 causes the switch SW1 to be connected to the first gamma table side during the time period of from the depression of the shutter release button 38 up to the completion of recording the compressed signal, while it causes the switch SW1 to be connected to the second gamma table side before depression of the shutter release button 38 or after completion of record operation. Therefore, in response to the completion of recording to the flash memory 28, the content of display on the LCD 36 is changed over from the still picture to a motion picture.

In addition, though a time period for the gamma correction by the second gamma correction circuit 24 is defined by the timer 42a in this embodiment, the muting operation may be released at a time that a further routine (not shown) has been executed for a predetermined number of times by supervising the further routine which is started at a time that the shutter release button 38 is depressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital still camera comprising:

a shutter release button;

first correction means for correcting a camera signal, when said shutter release button is depressed, by a first gamma characteristic to output a first image signal, the first correction means having a first table which stores the first gamma characteristic, wherein the first correction means comprises:

a third table previously stored with a third gamma characteristic; and selecting means for selecting either one of the first table or the third table;

storing means for storing the first image signal in a memory;

second correction means for correcting the first image signal by a second gamma characteristic to output a second image signal, the second correction means having a second table which stores the second gamma characteristic;

control means for causing said selecting means to select the first table during a time period starting from depression of said shutter release button to completion of storage of the first image signal to said memory, and to select the third table before depression of said shutter release button or after completion of storage of the first image signal; and disabling means for disabling said second correction means while said selecting means selects the third table; and display means for displaying the second image signal until storage of the first image signal to said memory is completed.

2. The digital still camera according to claim 1, wherein the display means is a dot matrix display, the first gamma characteristic has a gamma characteristic of a raster scan display, the third gamma characteristic has a gamma characteristic of a dot matrix display, and the second gamma characteristic has a gamma characteristic for converting the first gamma characteristic into the third gamma characteristic.

* * * * *